G. ZIMMERMANN.
MEANS FOR IDENTIFYING VEHICLES.
APPLICATION FILED JAN. 29, 1917.
1,247,061.
Patented Nov. 20, 1917.
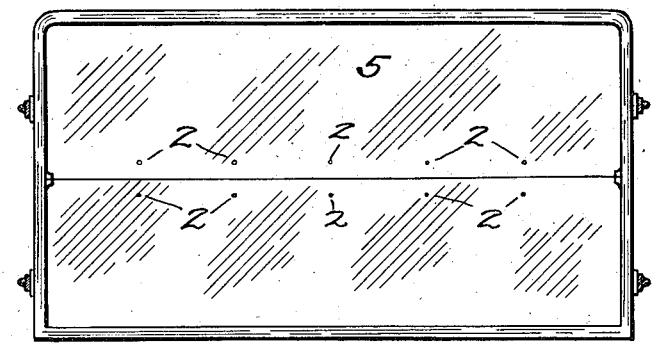
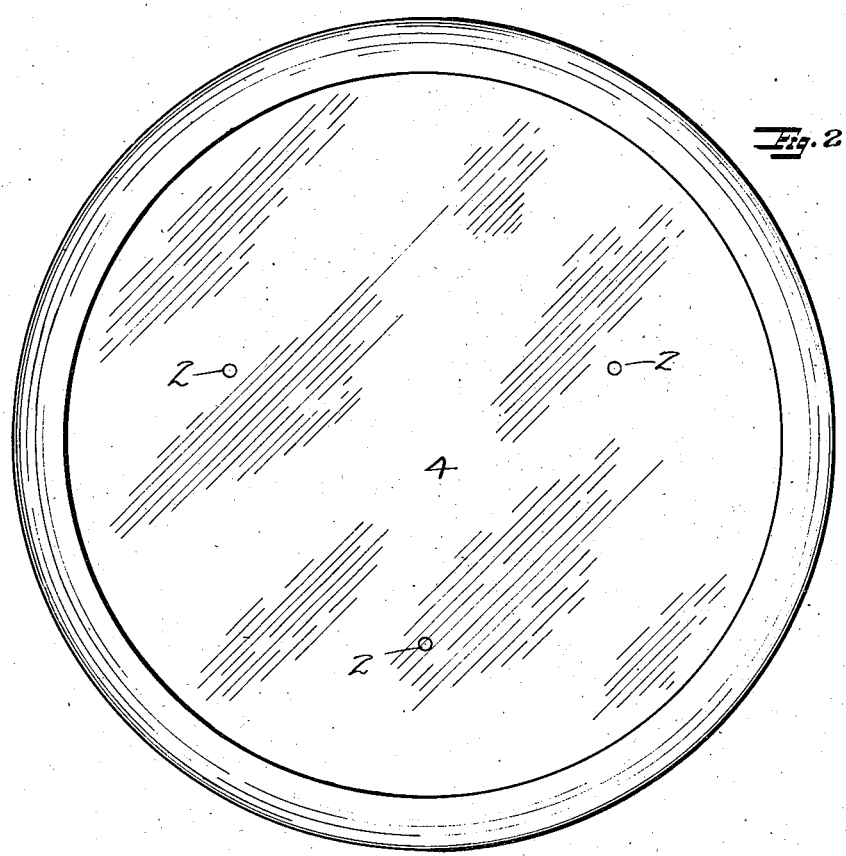
INVENTOR.
GEORGE ZIMMERMANN
BY *White Prost*
HIS ATTORNEYS

UNITED STATES PATENT OFFICE.

GEORGE ZIMMERMANN, OF SAN FRANCISCO, CALIFORNIA.

MEANS FOR IDENTIFYING VEHICLES.

1,247,061.  Specification of Letters Patent.  Patented Nov. 20, 1917.

Application filed January 29, 1917. Serial No. 145,105.

*To all whom it may concern:*

Be it known that I, GEORGE ZIMMERMANN, a citizen of the United States, and a resident of the city and county of San Francisco, State of California, have invented a certain new and useful Means for Identifying Vehicles, of which the following is a specification.

The invention relates to a means for identifying motor vehicles.

An object of the invention is to provide identification means on a motor vehicle, so that in the event of an accident and the escape of the vehicle, the vehicle may be identified and traced.

The invention possesses other advantageous features, some of which, with the foregoing, will be set forth at length in the following description, where I shall outline in full that form of the invention which I have selected for illustration in the drawings accompanying and forming part of the present specification. In the drawings I have shown one specific form of the invention, but it is to be understood that modifications within the scope of the succeeding claims, may be made.

When a motor vehicle is in an accident, the wind shield or the head light lenses or other frangible portion of the vehicle, is usually broken and the broken parts fall to the street or roadway. When the vehicle does not stop after the accident or has not been identified at the time of the accident, the police authorities have no clue to the identity of the vehicle except the broken pieces of glass left behind, and very often these pieces of glass are of no advantage in tracing the vehicle or in identifying it. In accordance with my invention I place identifying marks on the frangible portions of the vehicle which are likely to be broken in an accident, such as the head light lenses or wind shield. Broken pieces of these frangible elements picked up on the street or roadway after the accident will bear the identifying marks and the vehicle and its ownership can be readily traced.

In the accompanying drawings,

Figure 1 is an elevation of an automobile wind shield having the identifying means of my invention thereon.

Fig. 2 is an elevation of a head light lens similarly equipped.

Fig. 3 is an elevation of one form of identifying means.

The identifying means of my invention comprises, preferably, a small tag or stamp 2, made of paper, celluloid or other material, which bears an identifying number 3. A plurality of these stamps, each bearing the same number, are securely attached to frangible portions of the vehicle, such as the head light lens 4 or the wind shield 5, or both. The majority of States now register motor vehicles and issue license numbers, which are carried on the vehicle, and the number on the stamps is preferably the same as the license number, so that the identity of the vehicle may be quickly determined from the State registration lists. These lists contain the name and address of the owner of each registered vehicle. The stamps also preferably contain the name of the State in which the license number is issued and the year of registration.

Instead of using stamps which are secured to the glass, the data on the stamp may be etched directly onto the glass and this method is particularly advantageous in those States which assign the same license number to the same vehicle each year.

The small identification numbers are also of great value in tracing, finding and identifying stolen automobiles, particularly when the numbers are etched into the glass, since they cannot be changed as readily as the number plates.

I claim:

1. The combination with a motor vehicle having a frangible element thereon adapted to be broken in a head on collision of small identifying numbers disposed on said element whereby such collision will result in fragments of said element bearing one of said identifying numbers.

2. The combination with a motor vehicle having a frangible element arranged on the front thereof and adapted to be broken in an accident, of a plurality of small numbers corresponding to the registration number of the vehicle on said element.

3. The combination with a motor vehicle having a frangible element thereon adapted to be broken in an accident, of a plurality of stamps bearing numbers corresponding to the vehicle registration number secured to said element.

4. The combination with a motor vehicle having a wind shield and head light lenses, of a plurality of stamps bearing identification numbers attached to said wind shield and head light lenses.

In testimony whereof, I have hereunto set my hand at San Francisco, California, this 18th day of January, 1917.

GEORGE ZIMMERMANN.

In presence of—
H. G. Prost.